US012035352B2

(12) United States Patent
Vaidya et al.

(10) Patent No.: US 12,035,352 B2
(45) Date of Patent: Jul. 9, 2024

(54) SPECTRUM USAGE NOTIFICATIONS AND PROTECTED USE IN A SHARED WIRELESS NETWORK

(71) Applicant: Charter Communications Operating, LLC, St. Louis, MO (US)

(72) Inventors: Maulik V. Vaidya, Escondido, CA (US); Abdulrauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 412 days.

(21) Appl. No.: 17/335,665

(22) Filed: Jun. 1, 2021

(65) Prior Publication Data
US 2022/0386316 A1 Dec. 1, 2022

(51) Int. Cl.
*H04W 72/56* (2023.01)
*H04W 72/20* (2023.01)

(52) U.S. Cl.
CPC .......... *H04W 72/56* (2023.01); *H04W 72/20* (2023.01)

(58) Field of Classification Search
None
See application file for complete search history.

(56) References Cited

U.S. PATENT DOCUMENTS

| 7,035,242 | B2* | 4/2006 | Shaheen | H04W 92/02 |
| | | | | 370/467 |
| 9,681,490 | B1* | 6/2017 | Kakinada | H04W 76/36 |
| 2011/0256850 | A1* | 10/2011 | Selander | H04L 63/101 |
| | | | | 455/411 |
| 2018/0376470 | A1* | 12/2018 | Crawley | H04L 47/122 |
| 2022/0256644 | A1* | 8/2022 | Hafeez | H04W 16/14 |
| 2022/0337518 | A1* | 10/2022 | Butler | H04L 65/61 |
| 2023/0098387 | A1* | 3/2023 | Hafeez | H04W 52/281 |
| | | | | 370/329 |

(Continued)

OTHER PUBLICATIONS

Federal Communications Commission, FCC 18-149, Report and Order, Adopted: Oct. 23, 2018, Released: Oct. 24, 2018, pp. 1-100.

(Continued)

*Primary Examiner* — Nguyen H Ngo
(74) *Attorney, Agent, or Firm* — Armis IP Law, LLC

(57) ABSTRACT

According to one configuration, a wireless network is shared amongst a hierarchal tier of users. The wireless network environment includes one or more allocation management resources (such as so-called spectrum access systems). Each of one or more wireless network service providers operating respective wireless equipment such as one or more wireless base stations relies on a respective allocation management resource to allocate wireless channels for use. If desired, a respective wireless network service provider operating respective equipment can select an appropriate channel notification mode suitable to provide notification of incumbent use and/or reassignment of wireless bandwidth to the wireless base stations. In such an instance, in the event of re-assignment due to incumbent use, the allocation management resources communicate amongst each other regarding the incumbent use/reassignment and provide protected use of newly assigned wireless bandwidth to the first wireless network service provider.

39 Claims, 10 Drawing Sheets

(56) References Cited

U.S. PATENT DOCUMENTS

2023/0121842 A1* 4/2023 Zhang ............... H04Q 11/0067
398/58
2023/0131512 A1* 4/2023 Furuichi ............ H04W 52/243
455/454

OTHER PUBLICATIONS

Wireless Innovation Forum, Signaling Protocols and Procedures for Citizens Broadband Radio Service (CBRS): Spectrum Access System (SAS)—Citizens Broadband Radio Service Device (CBSD), Interface Technology Specification; Document WINNE TS-0016, Version V1.2.7, Mar. 21, 2022, pp. 1-60.

Wirless Innovation Forum, Requirements for Commercial Operation in the U.S. 3550-3700 MHz Citizens Broadband Radio Service Band, Document WINNF-TS-0112, Version V1.9.1, Mar. 11, 2020, pp. 1-81.

Wirless Innovation Forum, Signaling Protocols and Procedures for Citizens Broadband Radio Service (CBRS): Extensions to Spectrum Access System (SAS)—Citizens Broadband Radio Service Device (CBSD) Interface Technical Specification (Release 2), Document WINNF-TS-3002, Version V1.3.0, Dec. 22, 2021, pp. 1-63.

* cited by examiner

SPECTRUM USAGE NOTIFICATIONS AND PROTECTED USE IN A SHARED WIRELESS NETWORK

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference by wireless stations sharing use of the same spectrum.

There are multiple different types of wireless channels in a conventional CBRS band. For example, portions of spectrum in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user requires use of the channels, in theory, the licensed entity is able to freely use the PAL wireless channels in respective one or more predetermined geographical regions without interference by other lower priority entity users (such as lower priority GAA users).

Subsequent to allocation of one or more wireless channels, the wireless base stations use the allocated spectrum to provide one or more communication devices access to a remote network such as the Internet.

In a typical FCC (Federal Communication Commission) Auction, several companies are awarded PAL licenses on a per county basis in the lower 10 CBRS channels (from 3550 to 3650 MHz). As previously discussed, a grant of PAL licenses to a respective wireless base station operator affords the operator and corresponding wireless base station protection from co-channel interference generated by lower-tier GAA users in the PAL Protection Area (PPA) per FCC Part 96 rules.

A PAL licensee is required to protect higher tier (incumbent users) at all times. In a situation where incumbent radar activity is detected (e.g. a US naval aircraft carrier approaching US shoreline) in a Dynamic Protection Area (DPA), any operating PAL licensees operating in channel(s) used by that radar system, must vacate the channel(s) if and when indicated by the corresponding SAS/ENERGY STORAGE COMPONENT (Environmental Sensing Capability).

Based on the knowledge of all CBSD locations and granted powers in a so-called DPA (Dynamic Protection Area), a respective SAS computes a list of channel grants for each of the first 10 channels in the CBRS band which would have to be suspended if the DPA becomes activated. The list is known as a move list. A DPA may temporarily impact one or more PAL channels.

Clause 96.59(c) of FCC Part 96 rules indicates a requirement in which a respective SAS is to temporarily assign PAL license holders to different (substitute) wireless channels to protect Incumbent Access Users. However, different interpretations exist in the industry with respect to the need to implement said functionality. As a result, a wireless base station either may not get re-assigned to a different channel in the lower 100 MHz of CBRS band or may get temporarily assigned a substitute wireless channel which may experience interference by other wireless stations using that same wireless channel that was assigned as a substitute. Thus, even though the PAL user pays a fee to use available wireless channels in a licensed spectrum, those PAL users may receive unfair treatment compared to Tier 3 GAA users (lowest priority users).

BRIEF DESCRIPTION OF EMBODIMENTS

As previously discussed, there are deficiencies associated with conventional techniques of providing wireless services to mobile communication devices. For example, conventional techniques do not provide a way to protect licensed users from wireless interference during an event in which a primary assigned wireless channel allocated for use by a wireless network service provider is no longer available.

Embodiments herein provide improved use of wireless spectrum, promoting fair use of wireless channels amongst licensed and unlicensed wireless network service providers.

For example, a wireless system (wireless network environment) is shared amongst a hierarchal tier of users. The wireless network environment includes one or more allocation management resources (such as so-called spectrum access systems). In one embodiment, each of one or more wireless network service providers operating respective wireless base stations relies on a respective allocation management resource to allocate wireless channels for use. If desired, a respective wireless network service provider operating respective equipment in the wireless network environment can select and implement an appropriate channel notification mode suitable to provide notification of incumbent use and/or reassignment of wireless bandwidth.

More specifically, assume that a first allocation management resource in the network environment receives communications from a wireless base station such as operated by a first wireless network service provider. Based on the received communications, the first allocation management resource registers the wireless station to receive channel update notifications in accordance with a particular (such as selected) channel notification mode in which the wireless station is notified of wireless channel reassignments on an as-needed basis. Initially, the wireless station and/or first allocation management resource allocates a first wireless channel for use by the wireless station. The wireless base station uses the assigned first wireless channel to provide one or more communication devices access through the wireless base station to a remote network.

In further example embodiments, during the registering of the wireless station with the first allocation management resource, the first allocation management resource receives a message from the wireless station indicating that the wireless station supports the particular channel notification mode. In response to receiving the message such as request or support of the part channel notification mode, the first allocation management resource communicates an acknowledgement message to the wireless station. The acknowledgement message notifies the wireless station to implement the particular channel notification mode to receive channel update communications from the first allocation management resource.

In further example embodiments, the first allocation management resource monitors for use of the first wireless channel by an incumbent entity having higher priority rights than the wireless base station. In response to detecting use of the first wireless channel by the incumbent entity having higher priority rights to the first wireless channel than the wireless station, in accordance with the particular channel notification mode implemented (selected) by the wireless station and the first allocation management resource (and/or wireless network service provider #1), the first allocation management resource transmits a control command to the wireless station. In one embodiment, to protect the incumbent entity, the control command indicates assignment of a second wireless channel for use the wireless station instead of the first wireless channel.

In response to detecting cease of use of the first wireless channel by the incumbent entity, in accordance with the particular channel notification mode, the first allocation management resource transmits a control command indicating assignment of the first wireless channel for use by the wireless station instead of the second wireless channel. In one embodiment, the control command indicating assignment of the first wireless channel again for use by the wireless station instead of the second wireless channel is included in a heartbeat response message communicated from the first allocation management resource to the wireless station, the heartbeat response message associated with allocation of the second wireless channel to the wireless station.

Note that the control command can be communicated from the first allocation management resource to the wireless station in any suitable manner. For example, in one embodiment, first allocation management resource communicates the control command (such as channel re-assignment) in a heartbeat response message communicated to the wireless station. In one embodiment, the heartbeat response message is associated with allocation of the first wireless channel to the wireless station. In other words, the wireless station communicates a heartbeat message to the first allocation management resource during use of the first wireless channel by the wireless station. As previously discussed, the first allocation management resource detects that the first wireless channel is now used by an incumbent entity. Instead of the first allocation management resource communicating a heartbeat response to the wireless station to continue use of the first wireless channel, the first allocation management resource notifies the wireless station to terminate use of the first wireless channel and use a second (substitute) wireless channel instead of the first wireless channel.

Thus, in response to detecting use of the assigned wireless channel by an incumbent entity having a higher priority use of the first wireless channel than the wireless station, the first allocation management resource transmits communications from the allocation management resource to the wireless station. Such communications notify the wireless station to discontinue use of the first wireless channel and use a second wireless channel as a substitute to the first wireless channel.

In response to detecting cease of use of the first wireless channel by the incumbent entity, the first allocation management resource transmits second communications from the allocation management resource to the wireless station; the second communications notify the wireless station to discontinue use of the second wireless channel and use the first wireless channel as a substitute to the second wireless channel.

In one embodiment, the operator of the wireless station is a PAL (Priority Access License) operator user.

Further embodiments herein include, via the first allocation management resource, in response to detecting use of the first wireless channel by an incumbent entity having higher priority rights to the first wireless channel than the wireless station and allocation of a second wireless channel to the wireless station, providing notification of the allocated substitute second wireless channel to a second allocation management resource and/or an identity of a PAL operator (such as wireless network service provider) associated with the wireless station to a second allocation management resource. Additionally, embodiments herein include, from the first allocation management resource, in response to detecting cease of use of the first wireless channel by the incumbent entity and reallocation of the first wireless channel to the wireless station, providing notification of the reallocation of the first wireless channel to the second allocation management resource.

Additionally, or alternatively, the first allocation management resource provides notification to the second allocation management resource about a desire by the PAL operator to activate PAL protection (such as via a PPA or PAL Protection Area) with respect to the wireless base station. In accordance with the PAL protection, the second allocation management resource restricts use of the second wireless channel by one or more wireless stations so as to prevent interference with respect to use of the second wireless channel by the wireless base station managed by the first allocation management resource.

Thus, embodiments herein include, in response to detecting use of the first wireless channel by an incumbent entity having higher priority rights to the first wireless channel than the wireless station and allocation of a second wireless channel to the wireless station as a as a substitute to the first wireless channel, providing notification from the first allocation management resource to a second allocation management resource to prevent other wireless stations from using the second wireless channel and interfering with the wireless station. Additionally, embodiments herein include, in response to detecting cease of use of the first wireless channel by the incumbent entity and reallocation of the first wireless channel to the wireless station, providing notification from the first allocation management resource to the second allocation management resource to prevent other wireless stations from using the first wireless channel and interfering with the wireless station.

Thus, embodiments herein include, via the particular channel notification mode: in response to detecting use of the first wireless channel by an incumbent entity having higher priority rights to the first wireless channel than the wireless station, transmitting a first control command from the first allocation management resource to the wireless station, the first control command notifying the wireless station to use a second wireless channel as a substitute to the first wireless channel; and in response to detecting cease of use of the first wireless channel by the incumbent entity, transmitting a second control command from the first allocation management resource to the wireless station, the second control command notifying the wireless station to use the first wireless channel as a substitute to the second wireless channel.

Notification of: i) corresponding information about the PAL operator (such as identity of the wireless network service provider associated with the wireless base station) or affected PAL operators associated with a new channel assignment provides useful information to the second allocation management resource, ii) the occurrence of channel re-assignment information (such as new bandwidth of one or more new wireless channels assigned to the wireless base station as substitute bandwidth), and/or iii) an indication regarding whether to activate protection with respect to the newly assigned second wireless channel to the wireless base station ensures that the PAL operator associated with the wireless base station is able to use the newly assigned wireless channel without co-channel interference.

Still further example embodiments herein include, via the first allocation management resource: generating a notification indicating that the wireless station has been newly assigned a second wireless channel based on use of the first wireless channel by an incumbent entity having higher priority rights than the wireless station; ii) communicating the notification from the first allocation management resource to a second allocation management resource; and iii) receiving acknowledgement from the second allocation management resource of the assignment of the second wireless channel to the wireless station.

In yet further example embodiments, as previously discussed, the first allocation management resource assigns the wireless station use of a second wireless channel as a substitute to the first wireless channel. The first allocation management resource then communicates a notification of the assignment of the second wireless channel from the first allocation management resource to a second allocation management resource. The notification indicates to provide interference protection with respect to use of the second wireless channel by the wireless station.

In still further example embodiments, embodiments herein include specifying a recipient (such as by the wireless network service operator of the wireless base station) during registration of the wireless station with the first allocation management resource. The recipient (such as one or more of the wireless base station, another wireless base station, a domain proxy, etc.) is specified to receive corresponding channel grant revocation/new channel assignment messages from the allocation management resource (such as spectrum access system) in the event of detected incumbent use of the first wireless channel. In one embodiment, in accordance with the particular channel notification mode, the first allocation management resource communicates a channel update notification from the first allocation management resource to a recipient as specified by the wireless station during detected incumbent use of the first wireless channel. The channel update notification indicates allocation of a second wireless channel to the wireless station as a substitute to the first wireless channel.

Thus, embodiments herein provide novel ways of providing improved wireless channel management and notifications amongst different entities sharing use of spectrum in a wireless network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive communications from a wireless station; based on the received communications, register the wireless station to receive channel update notifications in accordance with a particular channel notification mode in which the wireless station is notified of wireless channel reassignments; and allocate a first wireless channel for use by the wireless station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
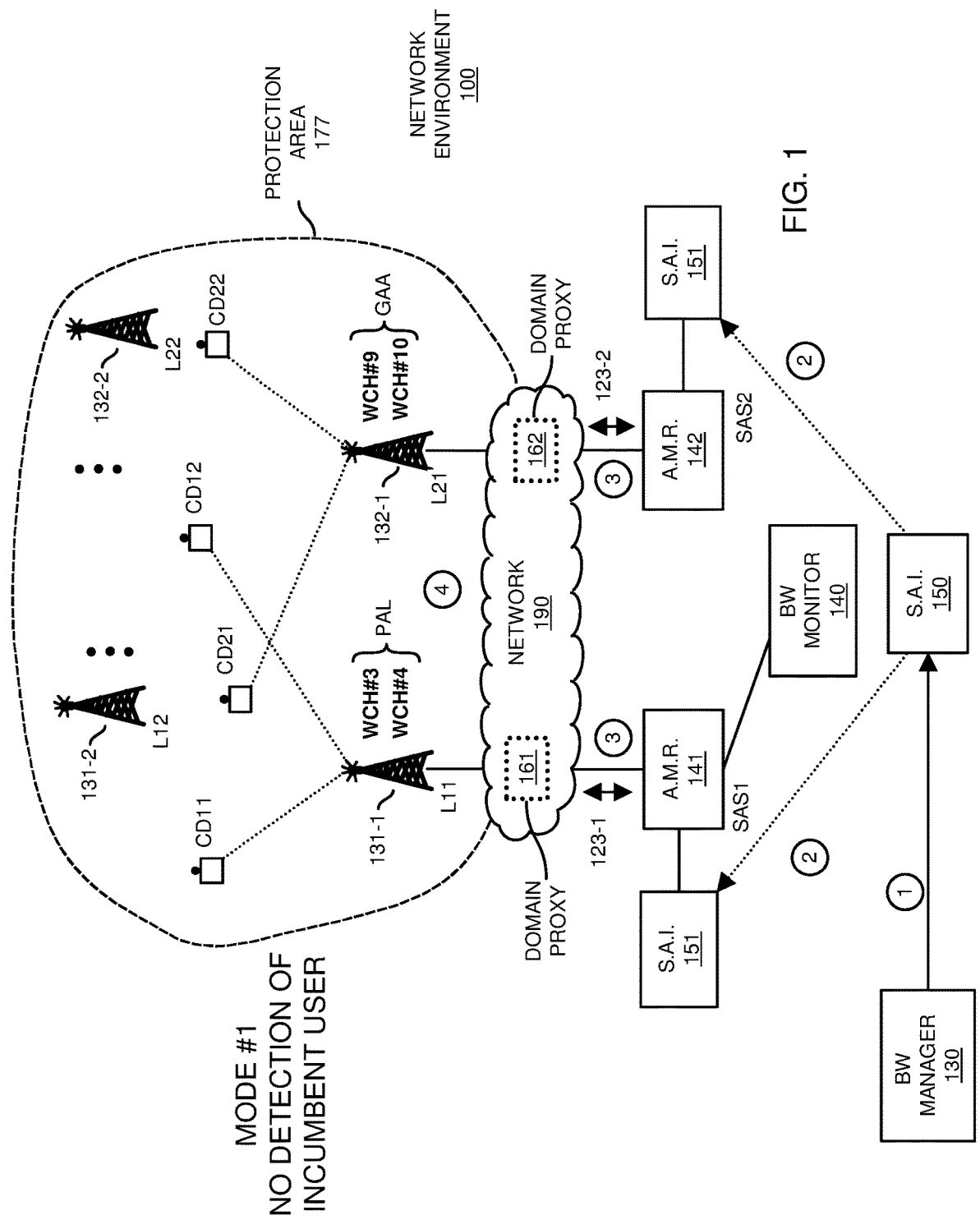
FIG. 1 is an example diagram illustrating a wireless network environment implementing hierarchical wireless spectrum allocation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Priority Access License (PAL) holders purchase wireless licenses and reserve the right to use them in corresponding pre-determined geographical areas of operation. If there are PAL operators in a CBRS network, the main purpose of SAS (Spectrum Access System) is to protect these PAL holders (licensed wireless network service providers) from the interference generated by other users in the network.

According to one embodiment, a wireless network is shared amongst a hierarchal tier of users. The wireless network environment includes one or more allocation management resources (such as so-called spectrum access systems). Each of one or more wireless network service providers operating respective wireless equipment such as one or more wireless base stations in the wireless network environment relies on a respective allocation management resource to allocate wireless channels for use. If desired, a respective wireless network service provider operating respective equipment can select an appropriate channel notification mode suitable to provide notification of incumbent use and/or reassignment of wireless bandwidth to the wireless base stations. In the event of re-assignment due to incumbent use, the allocation management resources communicate amongst each other regarding the incumbent use/reassignment and provide protected use of newly assigned wireless bandwidth.

Now, more specifically, FIG. 1 is an example diagram illustrating a hierarchical wireless network implementing allocation and use of wireless bandwidth according to embodiments herein.

As shown in this example embodiment, network environment 100 includes bandwidth manager 130, bandwidth monitor 140, allocation management resource 141 (such as spectrum access system S1), allocation management resource 142 (such as spectrum access system S2), wireless stations 131 (namely, wireless station 131-1, wireless station 131-2, . . . ), wireless stations 132 (namely, wireless station 132-1, wireless station 132-2, . . . ), communication devices CD11, CD12, . . . , communication devices CD21, CD22, . . . , and network 190 (such as including the Internet, wireless infrastructure, etc.). In one embodiment, the network 190 includes one or more domain proxies 161, 162, etc., to facilitate communications between the allocation management resources and the wireless base stations.

Note that each of the resources (such as wireless stations, communication devices, allocation management resources, spectrum monitor, spectrum manager, etc.) in network environment 100 can be configured to include appropriate hardware, software, or combination of hardware and software to carry out respective operations as discussed herein.

For example, bandwidth manager 130 can be configured as bandwidth manager hardware, bandwidth manager software, or a combination of bandwidth manager hardware and bandwidth manager software; bandwidth monitor 140 can be configured as bandwidth monitor hardware, bandwidth monitor software, or a combination of bandwidth monitor hardware and bandwidth monitor software; allocation management resource 141 can be configured as allocation management hardware, allocation management software, or a combination of allocation management hardware and allocation management software; allocation management resource 142 can be configured as allocation management hardware, allocation management software, or a combination of allocation management hardware and allocation management software; wireless station 131-1 can be configured as wireless station hardware, wireless station software, or a combination of wireless station hardware and wireless station software; wireless station 132-1 can be configured as wireless station hardware, wireless station software, or a combination of wireless station hardware and wireless station software; and so on.

Note that the allocation management resources as discussed herein can be implemented in any suitable manner. For example, in one embodiment, the spectrum allocation management resource 141 and the second spectrum allocation management resource 142 can be operated by different entities and can be disparately located with respect to each other.

Each communication device (such as CD11, CD12, etc.) is mobile or stationary with respect to a wireless station providing it access to network 190. In one embodiment, network 190 includes the Internet.

As further shown, wireless station 131-1 (such as operated by a first wireless network service provider/operator) is disposed at location L11 providing communication devices CD11, CD12, etc., access to network 190; wireless station 131-2 (such as operated by the first wireless network service provider/operator) is disposed at location L12, and so on.

Wireless station 132-1 (such as operated by a second wireless network service provider/operator) is disposed at location L21 providing communication devices CD21, CD22, etc., access to network 190; wireless station 132-2 (such as operated by the second wireless network service provider/operator) is disposed at location L22, and so on.

In one embodiment, the one or more wireless base stations operate in a so-called protection area 177 (such as a PAL Protection Area) in which the allocation management resource 141, allocation management resource 142, etc., protect the PAL equipment users and corresponding use of allocated licensed wireless channels amongst each other.

As further discussed herein, protected use of allocated wireless bandwidth (such as one or more wireless channels) includes operating in a manner to reduce a likelihood that any PAL users (licensed users such as wireless base stations 131) in the protection area 177 experience wireless interference from other wireless stations 132 (especially non-licensed users) also operating in the wireless network environment.

In this example embodiment, despite the implementation of protection area 177, note that an incumbent user (first-priority tier 1 user) has highest priority rights to use respective wireless channels.

For example, as its name suggests, the bandwidth monitor 140 (such as an ESC or Environmental Sensing Capability) monitors for use of the wireless channels 1-10 by a respective one or more incumbent entity. If the bandwidth monitor 140 detects use of one or more wireless channels by a higher priority user, the bandwidth monitor 140 notifies the allocation management resources 141 and 142 of this condition. In response to detecting the condition, the allocation management resources 141 and 142, in turn, notify (such as immediately or within a short timeframe such as a few minutes) the wireless stations (and corresponding wireless network service providers) to discontinue use of such wireless channels.

In one embodiment, each of the allocation management resources individually or collectively keeps track of a respective location of each of the wireless stations and allocates wireless channels such that two or more wireless stations implementing wireless communications do not interfere with each other. For example, in one embodiment, in furtherance of providing protected use of allocated bandwidth, the allocation management resources allocate different wireless channels to wireless stations that are in the same location or geographical region.

During further operation, note that the bandwidth manager 130 initially produces spectrum allocation information 151 indicating assignment of bandwidth (such as determined from results of a bandwidth auction in which operators pay license fees for use of wireless channels 1-10. An example of such as is shown in FIG. 2.

Figure 2:
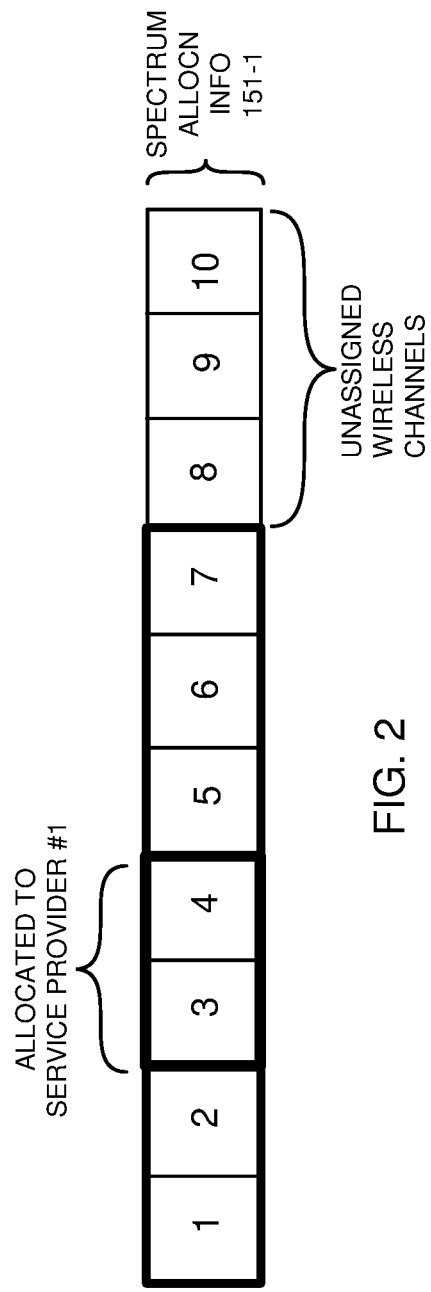
FIG. 2 is an example diagram illustrating allocation and use of available wireless channels during non-detection of an incumbent entity according to embodiments herein.

FIG. 2 is an example diagram illustrating assignment, allocation, and use of available wireless channels during non-detection of an incumbent entity according to embodiments herein.

As previously discussed, the wireless stations in network environment 100 can be operated by any number of multiple different service providers. For example, in one embodiment, the first wireless stations 131-1, 131-2, etc., are operated by a first wireless network service provider (second-priority tier 2 user or PAL user); the first wireless network service provider has a license (such as via paying a license fee) to use the first wireless spectrum.

In one embodiment, the second wireless stations 132-1, 132-2, etc., are operated by a second wireless network service provider (third-priority tier 3 user or GAA user); the second wireless network service provider being a non-licensed user of the second spectrum. In such an instance, the first wireless network service provider/operator has higher priority access rights to use of wireless bandwidth than the second wireless network service provider/operator.

Licensed users (wireless network service providers and corresponding wireless stations) are assigned a higher priority to use wireless channels 1-10 (in the licensed wireless channel band) than non-licensed users.

In this example embodiment, as shown via spectrum allocation information 151, the wireless channel 3 and 4 are assigned for use by the first wireless network service provider operating the equipment including wireless base stations 131.

Referring again to FIG. 1, the bandwidth manager 130 distributes the spectrum allocation information 151 to each of one or more spectrum allocation management resource 141 (such as SAS1) and spectrum allocation management resource 142 (such as SAS2).

In this example embodiment, the allocation management resources allocate use of the wireless bandwidth in accordance with the spectrum allocation information 151.

For example, each of wireless base station 131-1, wireless base station 131-2, etc., initially registers with the allocation management resource 141 for use of wireless channels. As previously discussed, because no incumbent entity is present, the allocation management resource 141 allocates use of wireless channels 3 and 4 to the wireless base stations 131.

Note that, in one embodiment, the network 190 includes a domain proxy 161 through which the wireless base stations 131 communicate with the allocation management resource 141. In a reverse direction, the allocation management resource 141 communicates through the domain proxy 161 to the wireless base stations 131. Alternatively, note that the wireless base stations 131 and the allocation management resource 141 transmit communications directly to each other without use of the domain proxy 161 as an intermediary resource.

Additionally, each of wireless base station 132-1, wireless base station 132-2, etc., operated by the second wireless network service provider registers with the allocation management resource 142 for use of wireless channels. Because no incumbent entity is present, the allocation management resource 142 allocates use of wireless channels 9 and 10 to the wireless base stations 132.

In one embodiment, the network 190 includes domain proxy 162 through which the wireless base stations 132 communicate with the allocation management resource 142. In a reverse direction, the allocation management resource 142 communicates through the domain proxy 162 to the wireless base stations 132. Alternatively, the wireless base stations 132 and the allocation management resource 142 transmit communications directly to each other without use of the domain proxy 162 as an intermediary resource.

Further in this example embodiment, an incumbent user/entity (such as a naval vessel implementing RADAR use of one or more wireless channels) is a first-priority tier 1 user in the priority hierarchy, the PAL users are second-priority tier 2 users in the priority hierarchy, and the GAA users are third-priority tier 3 users in the priority hierarchy. In the hierarchy, the incumbent users have highest priority access rights; the PAL users have second highest priority access rights; the GAA users have the lowest priority access rights.

Even though wireless channels 1-10 are in theory allocated/reserved for use by licensed PAL entities, different portions of the licensed spectrum of wireless channels 1-10 may be allocated for use by different PAL (licensed wireless network service providers) and/or GAA users (unlicensed wireless network service providers) depending on which of the wireless channels 1-10 are available for use in the spectrum hierarchy. For example, as previously discussed, because no incumbent entity is present and using bandwidth in the wireless network environment 100, and because wireless channels 8-10 are available for use, the allocation management resource 142 allocates use of wireless channels 9 and 10 to the wireless base stations 132 (such as GAA users).

Figure 3:
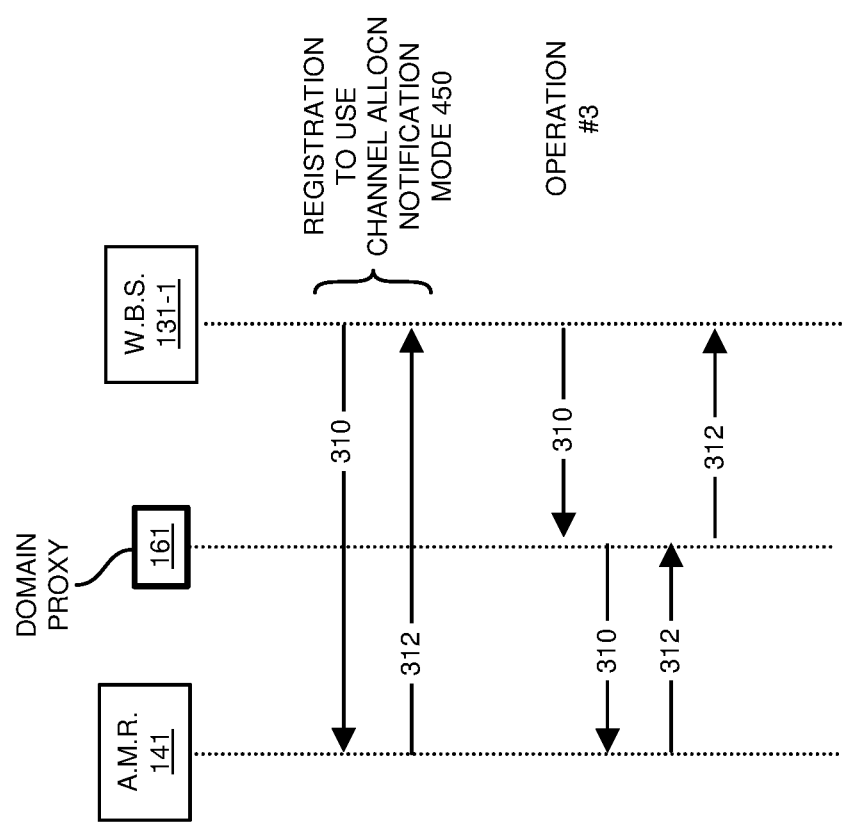
FIG. 3 is an example diagram illustrating notification mode registration according to embodiments herein.

FIG. 3 is an example diagram illustrating notification mode registration according to embodiments herein.

Embodiments herein include implementing a new Feature Capability (WF_PAL_HANDLE_DPA_ACTIVATION) in WINNF Release 2 (or higher) specifications for allowing a respective PAL operator to indicate its support of and preference of a channel re-assignment notification mode for handling PAL channel re-assignment due to DPA activation as a result of incumbent activity (or other triggers).

More specifically, each PAL licensee equipment, may at the time of CBSD (wireless base station) Registration and/or channel Grant procedure, indicate to a respective SAS, a preferred way of handling PAL channel re-assignment due to DPA activation as a result of incumbent activity (or other triggers).

In one embodiment, such preference is indicated via a new Feature Capability (WF_PAL_HANDLE_DPA_ACTIVATION) by CBSD in cbsdFeatureCapabilityList IE and by SAS in sasFeatureCapabilityList IE.

Such preference allows for a respective wireless station (such as CBSD) to indicate a preferred recipient of a SAS message (at a later time) indicating PAL channel grant revocation (due to e.g. incumbent detection). The indicated recipient may either be the CBSD itself, or a different CBSD, or a Domain Proxy.

Upon DPA (Dynamic Protection Area) activation due to use of one or more wireless channels by an incumbent entity, in one embodiment as further discussed herein, the allocation management resources (SASs) indicates a new PAL channel assignment(s) in OperationParam values of HEARTBEAT RESPONSE message towards affected CBSDs.

Embodiments herein include HEARTBEAT RESPONSE messages and OperationParam. In contrast to conventional heartbeat response techniques, embodiments herein include employment of so-called PAL move-in (i.e., wireless base station moved to a new channel assignment) via a heartbeat response to indicate new PAL channel assignment to a respective CBSD.

As a more specific example embodiment, during registration of the wireless base station 131-1 with the allocation management resource 141, the wireless base station 131-1 transmits communications 310 to the allocation management resource 141. In one embodiment, the communications 310 include a feature capability exchange request message/information indicating different functions supported by the wireless base station 131-1. In one embodiment, the communications 310 indicate that the wireless base station 131-1 supports a particular channel assignment notification mode 450 as further discussed herein below.

In response to receiving the communications 310, the allocation management resource 141 provides notification to the wireless base station 131-1 of the functions supported by the allocation management resource 141. In one embodiment, the allocation management resource 141 provides notification of supporting the particular channel assignment notification mode 450.

In further example embodiments, in response to receiving the communications 310, the allocation management resource 141 communicates an acknowledgement message to the wireless station 131-1 such as via communications 312. In one embodiment, the acknowledgement message notifies the wireless station 131-1 to implement the particular channel notification mode 450 to receive channel update communications from the first allocation management resource 141.

Thus, based on the received communications 310 and response communications 312, the allocation management resource 141 registers the wireless base station 131 to receive channel re-assignment update notifications in accordance with the particular channel notification mode 450 in which the wireless station is notified of wireless channel reassignments.

As previously discussed, the network 190 can be configured to include the domain proxy 161. In such an instance, during registration (or, alternatively, channel grant, or other communications), the wireless base station 131 transmits communication 310 to the domain proxy 161; the domain proxy 161 forwards the communication to the allocation management resource 141. In a reverse direction, the allocation management resource 141 transmits communication 312 to the domain proxy 161; the domain proxy 161 forwards the communication to the wireless base station 131-1. Thus, in one non-limiting example embodiment, communications 310 from the wireless base station 131-1 to the allocation management resource 141 pass through the domain proxy 161; communications 312 from the allocation management resource 141 to the wireless base station 131-1 pass through the domain proxy 161.

In further embodiments, each respective wireless network service provider operating equipment in the wireless network environment has an option of whether to implement the channel assignment notification mode 450 or operate in a conventional default mode instead. For example, a first wireless network service provider operating wireless base stations 131 may decide to implement the channel assignment notification mode 450 while another wireless network service provider operating wireless base stations 132 may decide not to implement or support the channel assignment notification mode 450.

Additional details of implementing the channel assignment notification mode 450 is further discussed below. However, in one embodiment, the channel assignment notification mode 450 includes a specific manner in which to perform so-called move-out functionality (such as terminating use of respective allocated bandwidth from one or more wireless stations in response to detecting the incumbent entity wireless channel usage) and move-in functionality (such as allocation of substitute bandwidth to the one or more wireless stations). As further discussed below, the wireless base stations 131 are moved out of the wireless channels 3 and 4 in response to detecting the incumbent entity 490 using such wireless channels. The wireless base stations 131 are moved into wireless channels 9 and 10.

Figure 4:
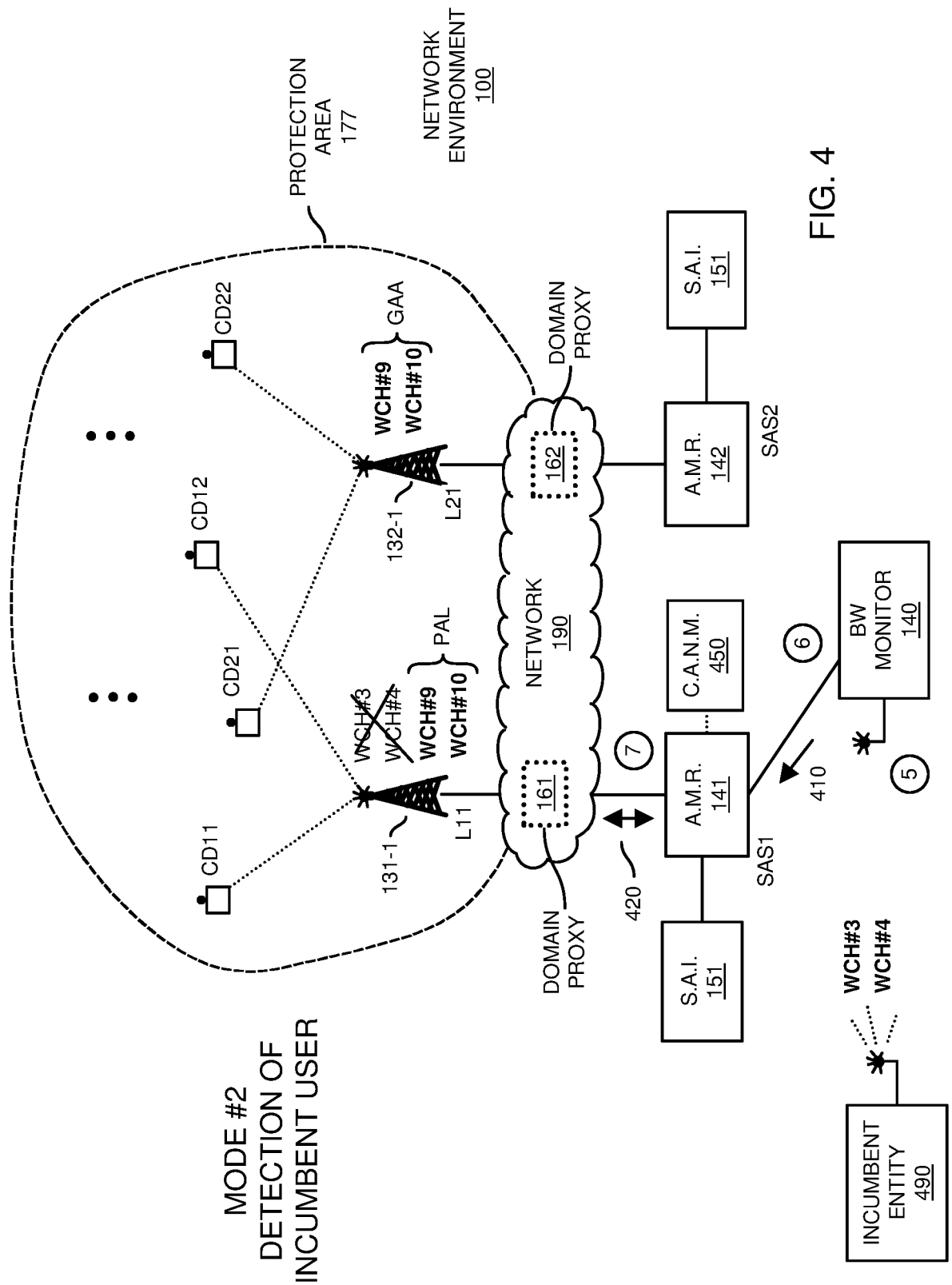
FIG. 4 is an example diagram illustrating detection of an incumbent entity and termination of using wireless channels according to embodiments herein.

FIG. 4 is an example diagram illustrating detection of an incumbent entity using a respective one or more wireless channels and termination of using such wireless channels according to embodiments herein.

For example, as further shown in operation #5 of FIG. 4, the bandwidth monitor 140 detects use of the wireless channels 3 and 4 by the incumbent entity 490.

Detecting the incumbent use can include physically detecting that the incumbent entity 490 transmits signals over the wireless channels 3 and 4 to implement RADAR functionality in the wireless network environment. Additionally, or alternatively, detected use of the wireless channels 3 and 4 can include receiving notification from the incumbent or other suitable entity that the wireless channels 3 and 4 are being used by the incumbent entity 490.

In operation #6, in response to detecting use of the wireless channels 3 and 4 by the higher priority entity (incumbent entity 490), the bandwidth monitor 140 communicates a message to the allocation management resource 141 indicating the usage by the higher priority entity (incumbent entity 490).

In operation #7, in accordance with the channel assignment notification mode 450, in response to receiving the message 410 indicating that the wireless channels 3 and 4 are used by a higher priority entity (incumbent entity 490), the allocation management resource 141 transmits communications 420 (such as one or more control commands) to the wireless base station 131-1, wireless base station 131-2, etc. The communications 420 indicate use of the wireless channels 3 and 4 by the incumbent entity 490 and that the wireless base stations 131 must terminate use of wireless channels 3 and 4.

In one embodiment, the communications 420 represent a heartbeat response message or other type of message communicated from the allocation management resource 141 to the wireless base stations 131. Thus, in one embodiment, the communications 420 include a control command that is included in a heartbeat response message (associated with wireless channels 3 and 4) communicated from the allocation management resource 141 to the wireless station 131.

Note further that, in addition to including notification to terminate use of wireless channels 3 and 4, embodiments herein include providing notification in the communications 420 to use alternative wireless channels 9 and 10. In other words, the allocation management resource 141 identifies, via one or more commands, other wireless channels 9 and 10 available for use and notifies the wireless base stations 131 to use the wireless channels 9 and 10 as a substitute to revoked wireless channels 3 and 4.

In such an instance, in response to receiving the communications 420 (including move-out and move-in information), the wireless base stations 131 switchover from use of wireless channels 3 and 4 to use of the substitute wireless channels 9 and 10 to communicate with respect to communication devices CD11, CD12, etc. In response to the new assignment, the wireless base stations 131 communicate the new channels to be used by respective communication devices CD11, CD12, etc.

Figure 5:
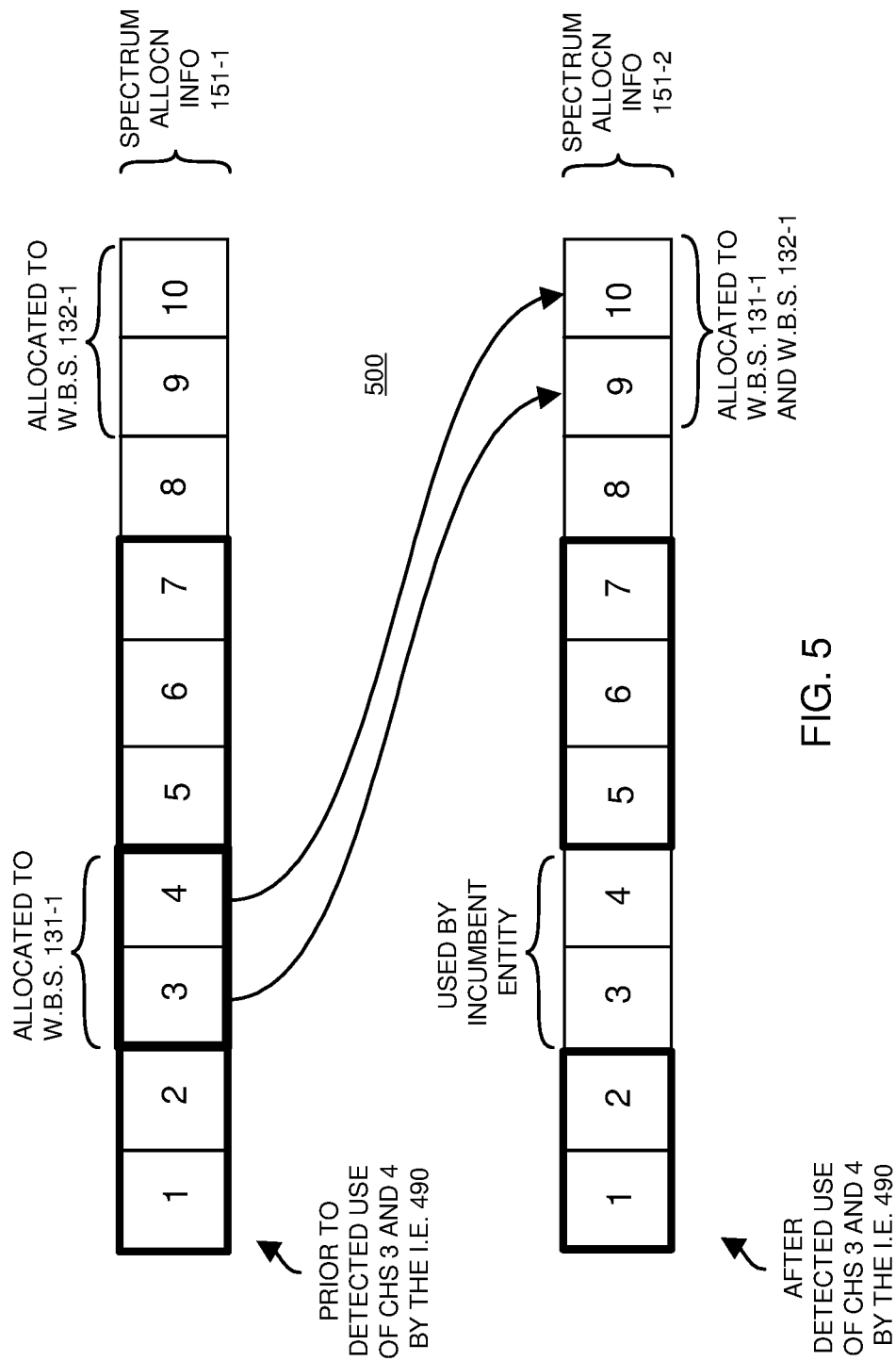
FIG. 5 is an example diagram illustrating re-allocation of wireless channels in response to detecting presence of the incumbent entity according to embodiments herein.

FIG. 5 is an example diagram illustrating re-allocation of wireless channels in response to detecting presence of the incumbent entity according to embodiments herein.

Via first instance of spectrum allocation information 151-1, graph 500 illustrates allocation of wireless channels 1-10 prior to detected use of wireless channels 3 and 4 by the incumbent entity 490. In such an instance, as previously discussed, the wireless channels 3 and 4 are used by wireless base stations 131 to wirelessly communicate with communication devices CD11, CD12, etc.

Via the second instance of spectrum allocation information 151-2, graph 500 illustrates allocation of wireless channels 1-10 after detected use of wireless channels 3 and 4 by the incumbent entity 490. In such an instance, as previously discussed, the wireless channels 3 and 4 are used by incumbent entity 490; the allocation management resource 141 allocates wireless channels 9 and 10 to the wireless base stations 131 to wirelessly communicate with communication devices CD11, CD12, etc.

Figure 6:
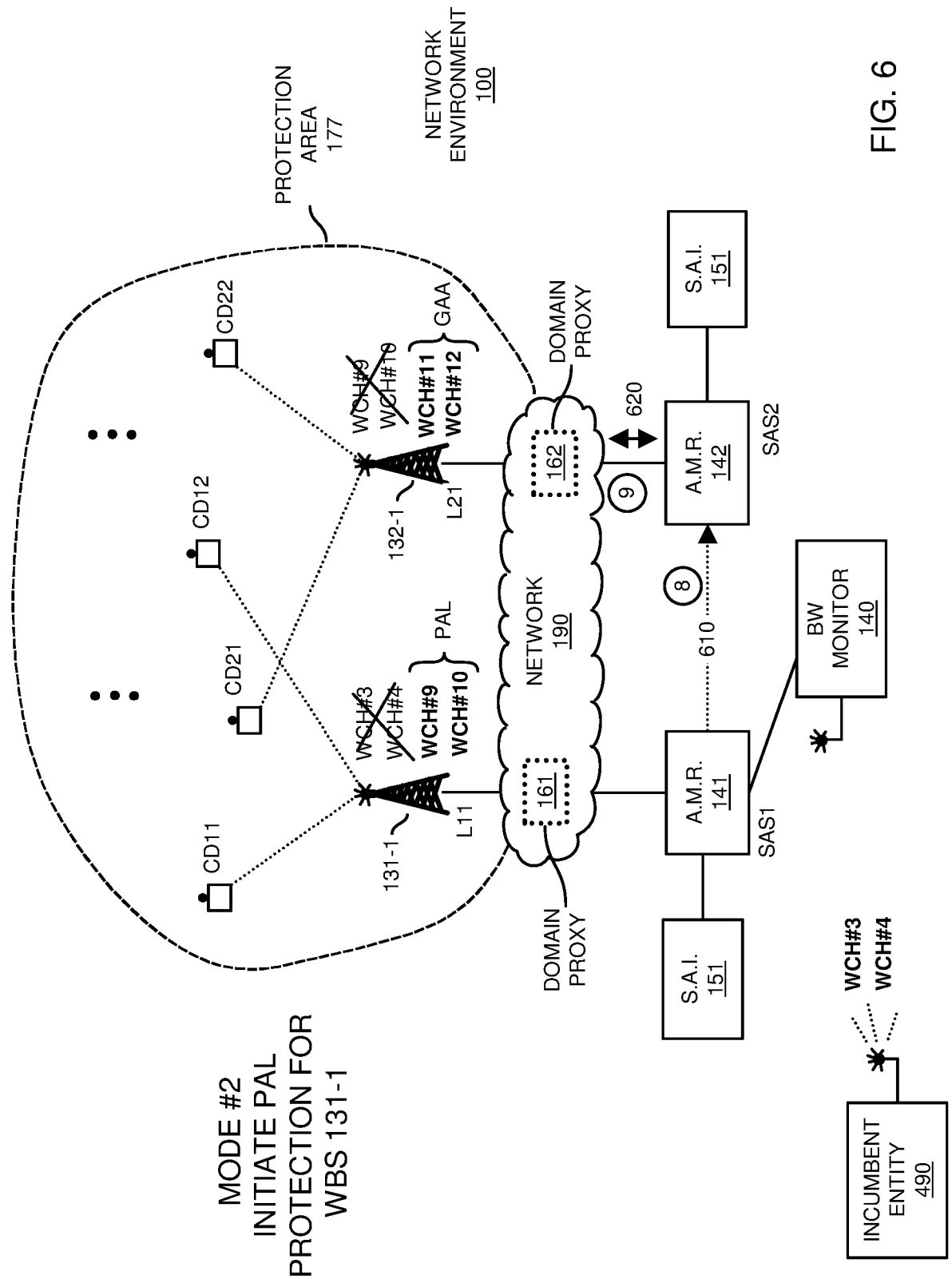
FIG. 6 is an example diagram illustrating exercise of PAL protection rights according to embodiments herein.

FIG. 6 is an example diagram illustrating exercise of PAL protection rights according to embodiments herein.

As previously discussed, the allocation management resource 141 receives notification of use of wireless channels 3 and 4 by the incumbent entity 490. This causes the allocation management resource 141 to terminate use of the wireless channels 3 and 4 by the wireless base stations 131. Additionally, the allocation management resource 141 notifies the wireless base stations 131 to use wireless channel 9 and 10.

As previously discussed, the wireless network service provider #1 operates the wireless base stations 131 in protection area 177. In one embodiment, presence of the wireless base stations in the protection area 177 means that the respective wireless network service provider operating wireless base stations 131 can invoke protected use of wireless channels (such as PAL wireless channels) used by the wireless base stations 131 at least with respect to non-PAL users.

In operation #8, in further response to receiving notification from the bandwidth monitor 140 to discontinue use of wireless channels 3 and 4, the allocation management resource 141 also transmits communications 610 to the allocation management resource 142. In one embodiment, the communications 610 include a respective notification that the wireless channels 3 and 4 were revoked from use by the wireless base station 131 and that the wireless base stations 131 have been assigned wireless channels 9 and 10. Communications 610 may further indicate that the wireless network service provider #1 assigned the wireless channels 9 and 10 is a PAL user afforded PAL protection, In one embodiment, in response to detecting use of the first wireless channel by an incumbent entity having higher priority rights to the first wireless channel than the wireless station and/or allocation of a second wireless channel to the wireless station, via communications 610, the allocation management resource 141 notifies the allocation management resource 142 of information such as: i) an identity of a PAL operator (identity of wireless network service provider #1) operating the wireless base stations 131, ii) identities of one or more PAL operators affected by the assignment of wireless channels 9 and 10 to the wireless network service provider #1 and wireless base stations 131, iii) the new PAL assignment of the substitute wireless bandwidth (such as wireless channels 9 and 10) to the wireless base stations 131, and/or iv) a request for the allocation management resource 142, wireless network service provider #2 (operating wireless base station 132), or any other wireless network service providers to provide the wireless base stations 131 protected use of the newly assigned wireless channels 9 and 10 because the wireless network service provider #1 is a PAL user having higher priority than, for example, the wireless network service provider #2 (such as a GAA user).

In yet further example embodiments, even though the wireless network service provider #2 operating the wireless base stations 132 or allocation management resource 142 controlling operation of the wireless base stations 132 themselves may not support or desire to implement the channel assignment notification mode 450, the allocation management resource 142 acknowledges the change in primary PAL channel assignment for affected PAL operators (such as wireless network service provider #1 operating wireless base stations 131 and assignment of new channels 9 and 10). In one embodiment, because the wireless base stations 132 are operated by a lower priority entity such as GAA, this includes providing the desired PAL protection to the wireless base stations 131 via notifying the wireless base station 132 in the protection area 177 to switchover to use of wireless channels 11 and 12 instead of using wireless channels 9 and 10 assigned to the wireless base stations 131.

In one embodiment, the allocation management resource 142 is made aware of a respective location of each of the wireless base station 131 and 132. If use of the wireless channels 9 and 10 by wireless base station 132 are likely to cause interference with the wireless base stations 131 using wireless channels 9 and 10, then the allocation management resource 142 notifies the wireless base stations 132 to switchover to use of the wireless channels 11 and 12 (such as GAA wireless channels) via communications 620 in operation #9.

In still further example embodiments, the communications 610 are so-called CPAS communications. CPAS (Coordinated Periodic Activities among SASes) are daily/occasional messages communicated to all allocation management resources in the wireless network environment 100 to synchronize and to ensure protection of incumbent entity 490. For example, based on messages, the spectrum allocation management resources then avoid allocating use of the wireless channels 3 and 4 because they are is unavailable due to use by the incumbent entity 490.

Thus, if the allocation management resource 142 (or other allocation management resources in wireless network environment 100) do not immediately receive notification of an incumbent entity using wireless channels 3 and 4 such as via bandwidth monitor 140, the allocation management resources learn of such use via communications 610.

Figure 7:
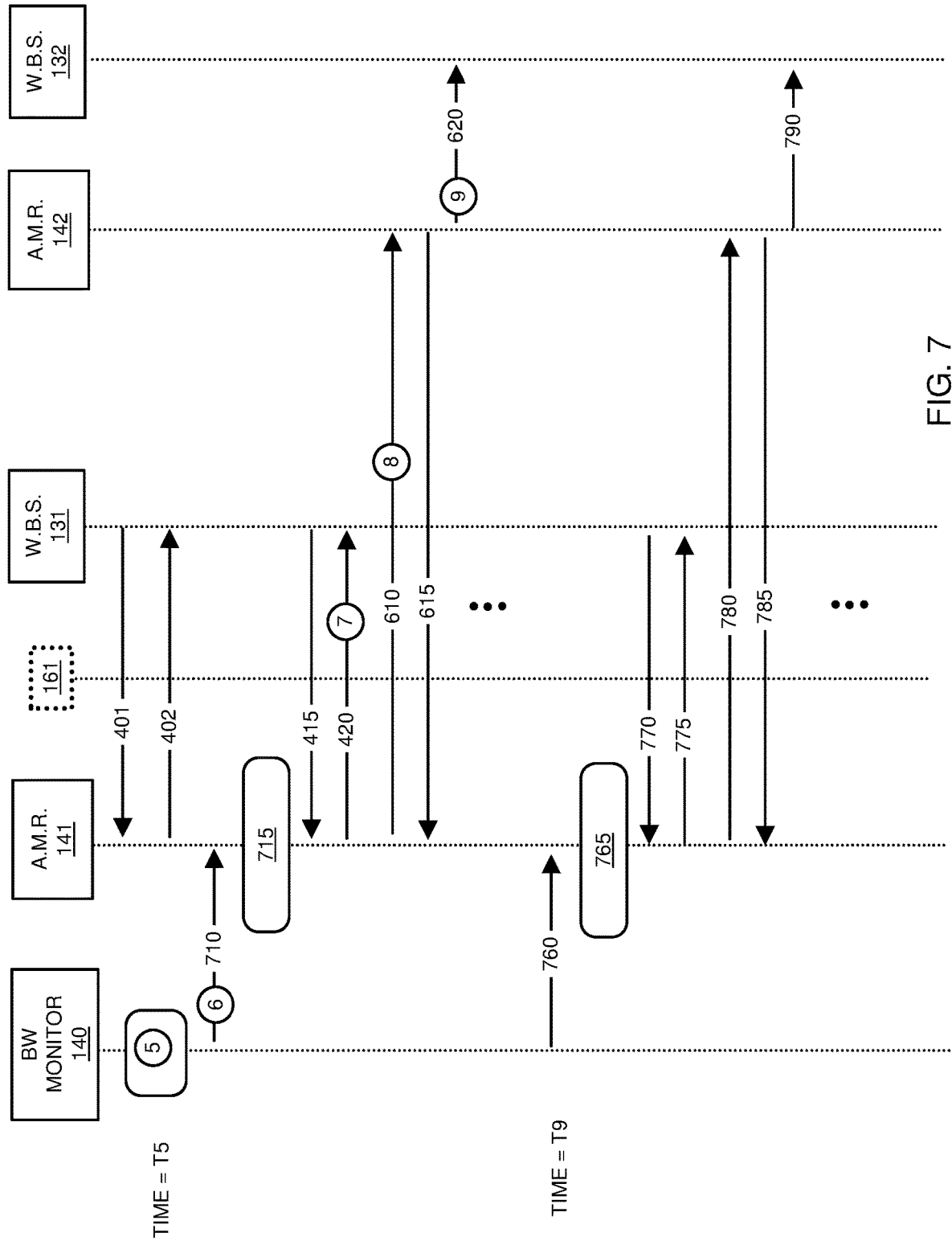
FIG. 7 is an example diagram illustrating notification of wireless channel usage by an incumbent entity and coordinated communications amongst allocation management resources according to embodiments herein.

FIG. 7 is an example diagram illustrating notification of a wireless channel by an incumbent entity and coordinated communications amongst allocation management resources according to embodiments herein.

In this example embodiment, the timing diagram 700 illustrates operations executed by different entities in the wireless network environment 100.

For example, prior to time T5, in a manner as previously discussed, the wireless base stations 131 use allocated wireless channels 3 and 4. In one embodiment, via communications 401, the wireless base station 131-1 communicates a heartbeat message associated with the channel grant of wireless channels 3 and 4 to the allocation management resource 141. Via communications 402, the allocation management resource 141 communicates a heartbeat response to the wireless base station 131-1. In one embodiment, the back and forth heartbeat communications are required on a regular basis for the wireless base stations 131 to be provided continued use of the wireless channels 3 and 4.

At or around time T5, via operation #5, the bandwidth monitor 140 detects use of the wireless channels 3 and 4 by the incumbent entity 490. In response to this event, in operation #6, the bandwidth monitor 140 transmits communications 410 (710) to the allocation management resource 141 indicating incumbent use of the wireless channels 3 and 4.

Further, in response to receiving notice of the incumbent use at or around time T5, via operation 715, the allocation management resource 715 identifies other channels (such as wireless PAL channels 8-10) available for PAL users. The allocation management resource 141 selects wireless channels 9 and 10 for use by the wireless base stations 131.

In one embodiment, the allocation management resource 141 communicates the revocation of the wireless channels 3 and 4 and newly assigned wireless channels 9 and 10 in a respective heartbeat communication. For example, in one embodiment, the wireless base station 131-1 communicates a heartbeat communication 415 to the allocation management resource 141. In response to receiving the heartbeat communication 415, the allocation management resource 141 communicates a heartbeat response such as including notification of the revocation of the wireless channels 3 and 4 and newly assigned wireless channels 9 and 10 in communication 420 to the wireless base station 131-1. Alternatively, the allocation management resource 141 communicates notification of the revocation and new channel assignment in a non-heartbeat communication message.

Further, as previously discussed, in response to receiving notification of the communications 410 indicating incumbent use of the wireless channels 3 and 4, in operation #8, the allocation management resource 141 transmits communications 610 to the allocation management resource 142. Via communications 610, the allocation management resource 141 notifies the allocation management resource 142 of any suitable information such as: i) an identity of a PAL operator (identity of wireless network service provider #1) operating the wireless base stations 131, ii) the assignment of the substitute wireless bandwidth (such as wireless channels 9 and 10) to the wireless base stations 131, and/or iii) a request for the wireless network service provider #2 (operating wireless base station 132) to provide the wireless base stations 131 protected use of the newly assigned wireless channels 9 and 10 because the wireless network service provider #1 is a PAL user having higher priority than the wireless network service provider #2 (such as a GAA user).

Via communications 615, the allocation management resource 142 acknowledges receipt of the communications 610.

Via operation #9, and communications 620, if the allocation management resource 142 determines that use of the wireless channels 9 and 10 by wireless base station 132 is likely to cause interference with the wireless base stations 131 using wireless channels 9 and 10 (such as based on a location of the wireless base stations 132 being near wireless base stations 131), then the allocation management resource 142 notifies the wireless base stations 132 to switchover to use of the wireless channels 11 and 12 (such as GAA wireless channels) via communications 620 in operation #9. In one embodiment, the allocation management resource 142 re-assigns the wireless base stations 132 to use the wireless channels 11 and 12 in response to detecting that the wireless network service provider #1 is assigned a higher priority level than the wireless network service provider #2 operating the wireless base stations 132.

At or around time T9, the bandwidth monitor 140 detects cease of use of the wireless channels 3 and 4 by the incumbent entity 490. In response to this termination of use event, the bandwidth monitor 140 transmits communications 760 to the allocation management resource 141 indicating discontinued use of the wireless channels 3 and 4 by the incumbent entity.

Further, in response to receiving notice of the incumbent non-use of wireless channels 3 and 4 at or around time T9, via operation 765, the allocation management resource 715 identifies the original channels 3 and 4 are assigned to the wireless network service provider #1 associated with the wireless base stations 131. The allocation management resource 141 reallocates wireless channels 3 and 4 for use by the wireless base stations 131 because they are available and are not used by the incumbent entity.

In one embodiment, the allocation management resource 141 communicates the reallocation of the wireless channels 3 and 4 and revocation of wireless channels 9 and 10 in a respective heartbeat communication. For example, in one embodiment, the wireless base station 131-1 communicates a heartbeat communication 770 to the allocation management resource 141 associated with wireless channels 9 and 10. In response to receiving the heartbeat communication 770, the allocation management resource 141 communicates a heartbeat response 775 such as including notification of the revocation of the wireless channels 9 and 10 and reallocation of wireless channels 3 and 4 in communication 775 to the wireless base station 131-1. Alternatively, the allocation management resource 141 communicates notification of the revocation of wireless channels 9 and 10 and new channel assignment of wireless channels 3 and 4 in one or more non-heartbeat communication messages.

Further, as previously discussed, in response to receiving notification of the communications 760 indicating no more incumbent use of the wireless channels 3 and 4, the allocation management resource 141 transmits communications 780 to the allocation management resource 142. Via communications 780, the allocation management resource 141 notifies the allocation management resource 142 of any suitable information such as: i) an identity of a PAL operator (identity of wireless network service provider #1) operating the wireless base stations 131, ii) the assignment and/or reallocation of the wireless channels 3 and 4 to the wireless base stations 131, and/or iii) a request for the wireless network service provider #2 (operating wireless base stations 132) to provide the wireless base stations 131 protected use of the newly assigned wireless channels 3 and 4 because the wireless network service provider #1 is a PAL user having higher priority than the wireless network service provider #2 (such as a GAA user), iv) notification that wireless channels 9 and 10 are available, and so on.

Via communications 785, the allocation management resource 142 acknowledges receipt of the communications 780.

Via communications 790, the allocation management resource 142 notifies the wireless base stations regarding assignment of channels 9 and 10 for their use. In such an instance, the allocation management resource 142 notifies the wireless base stations 132 to use wireless channels 9 and 10 again as they are no longer used by the wireless base stations 131.

Figure 8:
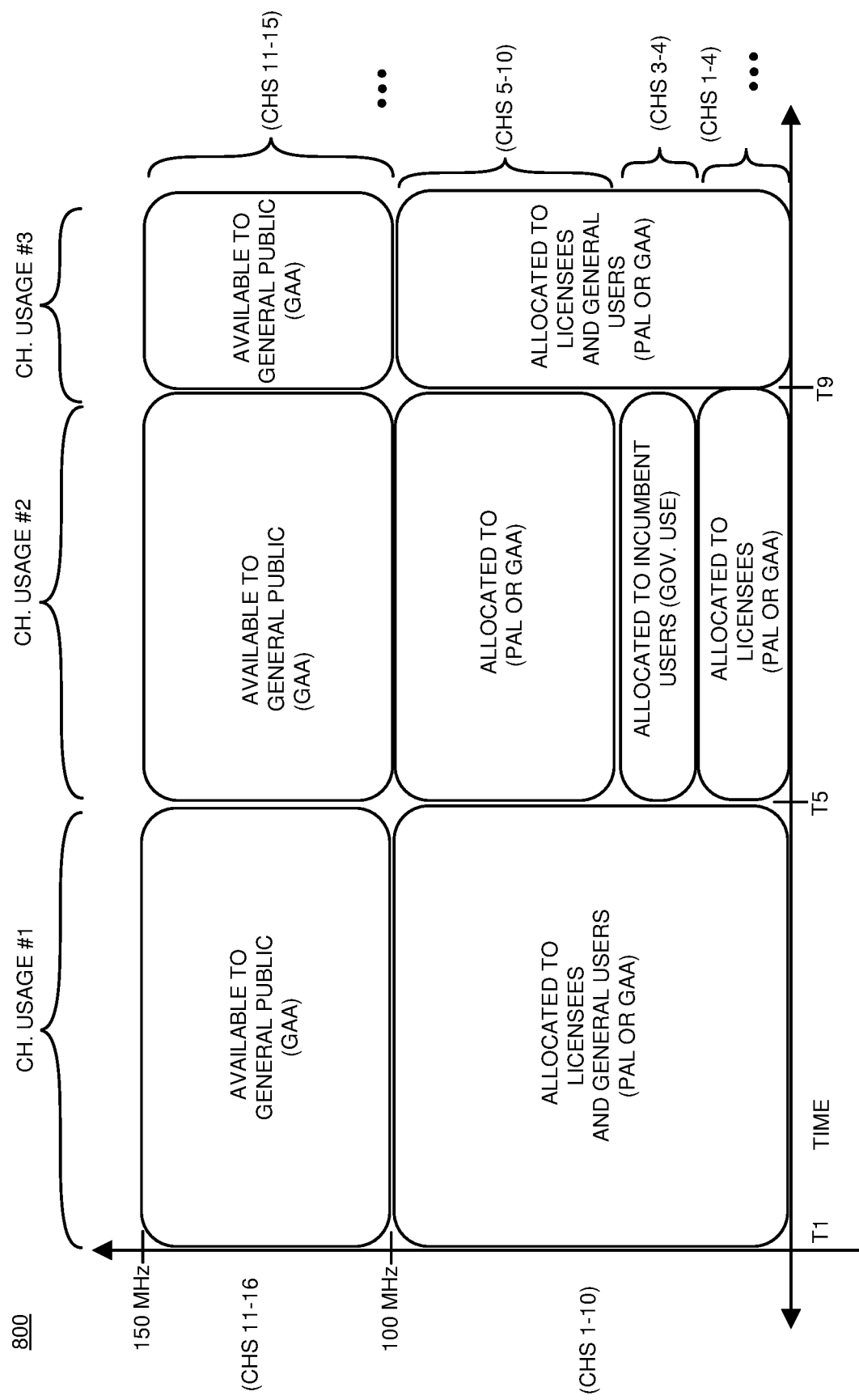
FIG. 8 is an example diagram illustrating allocation of spectrum from a CBRS (Citizen Band Radio Service) and change in allocation according to embodiments herein.

FIG. 8 is an example diagram illustrating generation of dynamic channel allocation information indicating allocation of spectrum at different tiers of a channel hierarchy according to embodiments herein.

As previously discussed, bandwidth manager 130 can be configured to assign any suitable type of wireless spectrum (spectrum, wireless channels, etc.) for use by the communication devices such as wireless base stations in the network environment 100.

In one non-limiting example embodiment, the bandwidth manager 130 and allocation management resources allocate spectrum (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the allocation management resources 141 and 142 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as use via a so-called incumbent user) is detected or requested via appropriate input (such as around time T5) to the allocation management resource 140, certain channels (such as those used by the general public) are no longer available for use.

More specifically, in this example, graph 800 indicates that between time T1 and time T5 (such as mode #1 or first condition), there is no indication detection of an incumbent user and thus licensed wireless channels 1-10 are available for use by licensed wireless user (and potentially unlicensed GAA users) for use; channels 11-15 are available for use by unlicensed GAA users. In a manner as previously discussed, these channels are allocated for use by the wireless base stations in network environment 100.

As further shown, at or around time T5, assume that the spectrum monitor 140 detects use of the wireless channels 3 and 3 by an incumbent user having higher priority than the PAL users and GAA users. In such an instance, the bandwidth monitor 140 notifies the spectrum allocation management resource 141 and spectrum allocation management resource 142 of such use prompting discontinued use of wireless channels 3 and 4 as well as reallocation of wireless channels #9 and 10 in a manner as previously discussed during conditions in which wireless channels #3 and 4 are unavailable.

Figure 9:
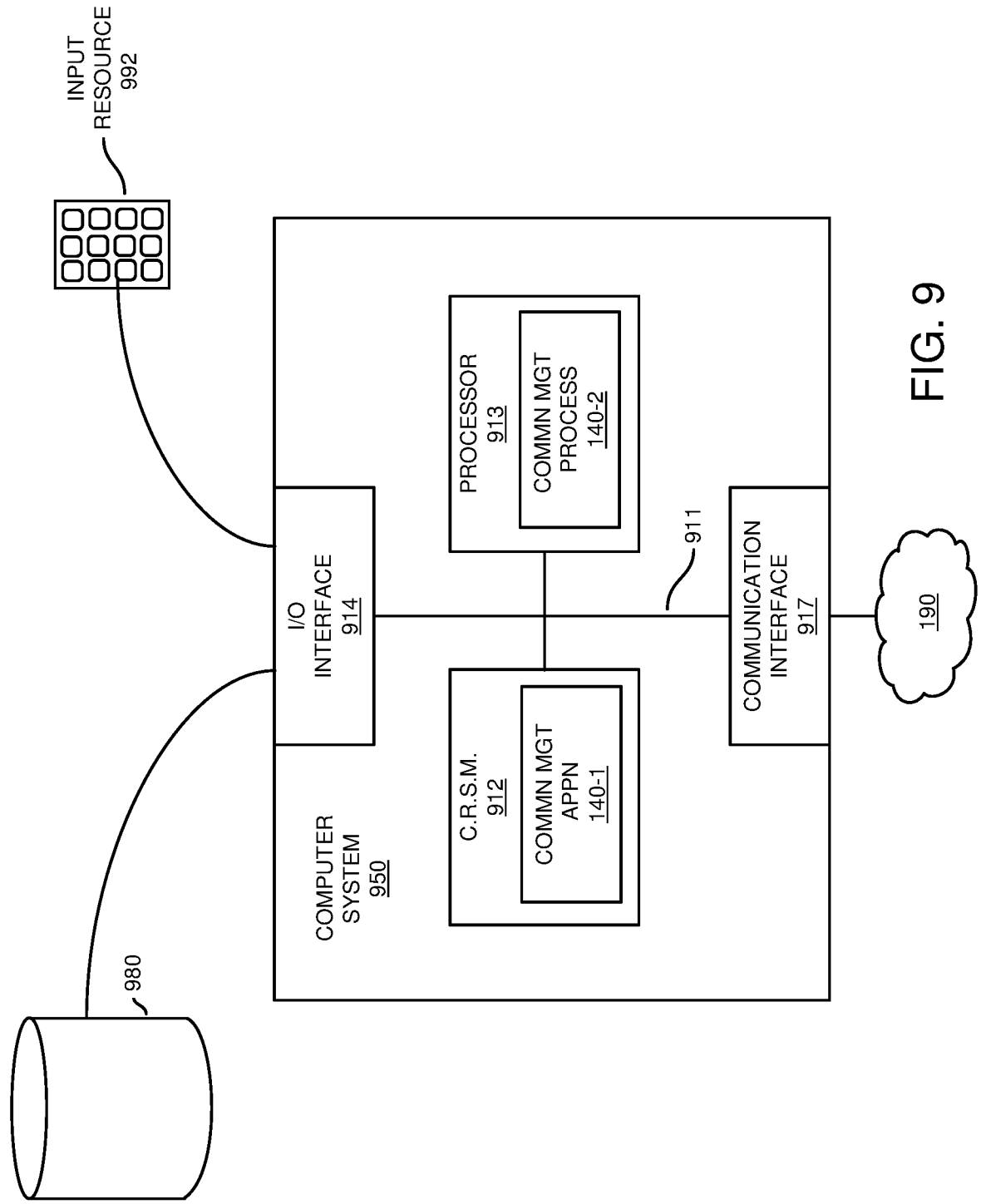
FIG. 9 is a diagram illustrating example computer architecture to execute one or more operations according to embodiments herein.

FIG. 9 is an example block diagram of a computer system for implementing any of the operations as previously discussed according to embodiments herein.

Any of the resources (such as communication management resource, allocation management resource 141, allocation management resource 142, bandwidth monitor 130, bandwidth manager 140, wireless station 131-1, wireless station 132-1, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
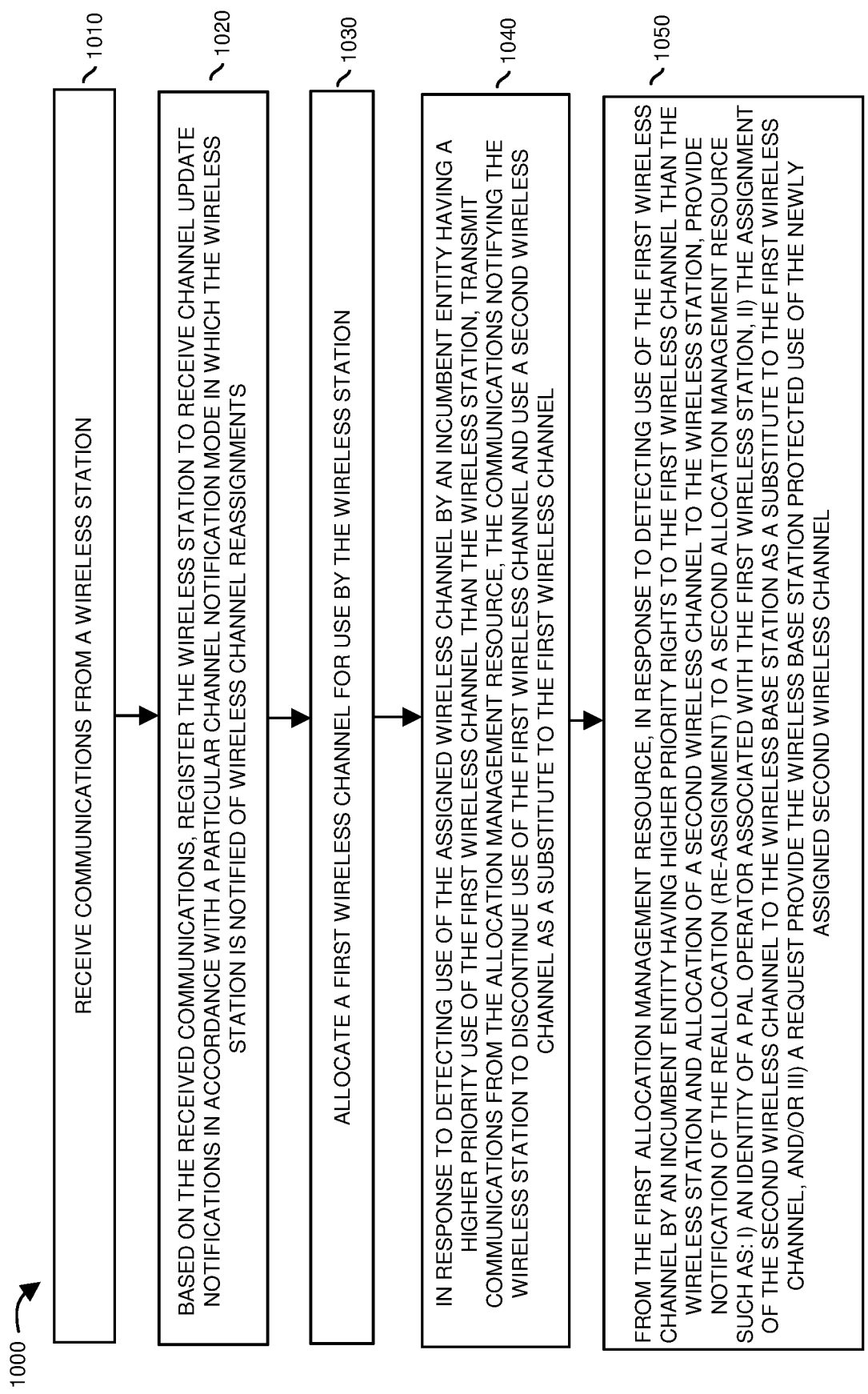
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the allocation management resource 140 receives communications from a wireless base station 131-1.

In processing operation 1020, based on the received communications, the allocation management resource 141 registers the wireless station 131-1 to receive channel update notifications in accordance with a particular channel notification mode 450 in which the wireless station is notified of wireless channel reassignments.

In processing operation 1030, the allocation management resource 141 allocates a first wireless channel (such as wireless channel 3) for use by the wireless station 131-1.

In processing operation 1040, in response to detecting use of the assigned wireless channel 3 by an incumbent entity having a higher priority use of the first wireless channel 3 than the wireless station 131-1, the allocation management resource 141 transmits communications to the wireless station 131-1. The communications notify the wireless station 131-1 to discontinue use of the first wireless channel 3 and use a second wireless channel 9 as a substitute to the wireless channel 3.

In processing operation 1050, from the first allocation management resource 141, in response to detecting use of the first wireless channel 3 by an incumbent entity having higher priority rights to the first wireless channel 3 than the wireless station 131-1 and allocation of a second wireless channel 9 to the wireless station 131-1, the allocation management resource 141 provides notification of the reallocation (re-assignment) to a second allocation management resource 142. The notification to the second allocation management resource 142 includes information such as: i) notification of an identity of a PAL operator associated with the first wireless channel 131-1, ii) notification of the assignment of the second wireless channel 9 to the wireless base station 131-1 as a substitute to the first wireless channel 3, and/or iii) a protection request notification for the allocation management resource 142 to provide the wireless base station 131-1 protected use of the newly assigned second wireless channel 9 in the protection area 177. In one embodiment, as previously discussed, the protection request notification causes the allocation management resource 142 to revoke wireless channel 9 from being used by the wireless base stations 132 (GAA users), reducing a possibility of interference with the higher priority users (PAL users) entity operating the wireless base stations 131.

Note again that techniques herein are well suited to facilitate protection of licensed users (wireless network service providers) in a hierarchical wireless spectrum allocation system. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   at a first allocation management resource operated in a wireless network environment shared amongst a hierarchy of users:
   receiving communications from a wireless station;
   based on the received communications, registering the wireless station to receive channel update notifications in accordance with a particular channel notification mode in which the wireless station is notified of wireless channel reassignments;
   wherein registering the wireless station to receive channel update notifications in accordance with the particular channel notification mode includes: i) at the first allocation management resource, receiving a message from the wireless station indicating that the wireless station supports the particular channel notification mode; and ii) in response to receiving the message, communicating an acknowledgement message to the wireless station, the acknowledgement message notifying the wireless station to implement the particular channel notification mode to receive channel update communications from the first allocation management resource; and
   allocating a first wireless channel for use by the wireless station.

2. The method as in claim 1 further comprising:
   in response to detecting use of the first wireless channel by an incumbent entity having higher priority rights to the first wireless channel than the wireless station, in accordance with the particular channel notification mode, transmitting a first control command indicating assignment of a second wireless channel for use by the wireless station instead of the first wireless channel.

3. The method as in claim 2, wherein the first control command is included in a heartbeat response message communicated from the first allocation management resource to the wireless station, the heartbeat response message associated with allocation of the first wireless channel to the wireless station.

4. The method as in claim 2 further comprising:
   in response to detecting cease of use of the first wireless channel by the incumbent entity, in accordance with the particular channel notification mode, transmitting a second control command indicating assignment of the first wireless channel for use by the wireless station instead of the second wireless channel.

5. The method as in claim 4, wherein the first control command indicating assignment of the first wireless channel for use by the wireless station instead of the second wireless channel is included in a heartbeat response message communicated from the first allocation management resource to the wireless station, the heartbeat response message associated with allocation of the second wireless channel to the wireless station.

6. The method as in claim 1 further comprising:
   in response to detecting use of the first wireless channel by an incumbent entity assigned a higher priority level to use the first wireless channel than the wireless station, transmitting a first notification from the first allocation management resource to the wireless station, the first notification notifying the wireless station to discontinue use of the first wireless channel and use a second wireless channel as a substitute to the first wireless channel.

7. The method as in claim 6 further comprising:
   in response to detecting cease of use of the first wireless channel by the incumbent entity, transmitting a second notification to the wireless station, the second notification notifying the wireless station to discontinue use of the second wireless channel and use the first wireless channel as a substitute to the second wireless channel.

8. The method as in claim 1 further comprising:
   from the first allocation management resource, in response to detecting i) use of the first wireless channel by an incumbent entity having higher priority rights to the first wireless channel than the wireless station, and ii) reallocation of a second wireless channel to the wireless station, providing notification of the reallocation to a second allocation management resource of an identity of a PAL (Priority Access License) operator associated with the wireless station.

9. The method as in claim 8 further comprising:
   from the first allocation management resource, in response to detecting cease of use of the first wireless channel by the incumbent entity and reallocation of the first wireless channel to the wireless station, providing notification of the reallocation of the first wireless channel to the second allocation management resource.

10. The method as in claim 1 further comprising:
    in response to detecting: i) use of the first wireless channel by an incumbent entity having higher priority rights to the first wireless channel than the wireless station, and ii) allocation of a second wireless channel to the wireless station, providing notification from the first allocation management resource to a second allocation management resource of an identity of the second wireless channel assigned to the wireless station.

11. The method as in claim 10 further comprising:
    in response to detecting cease of use of the first wireless channel by the incumbent entity, and reallocation of the first wireless channel to the wireless station, providing notification from the first allocation management resource to the second allocation management resource of the reallocation of the first wireless channel assigned to the wireless station.

12. The method as in claim 1 further comprising:
    in response to detecting: i) use of the first wireless channel by an incumbent entity having higher priority rights to the first wireless channel than the wireless station, and ii) reallocation of a second wireless channel to the wireless station, providing notification from the first allocation management resource to a second allocation management resource to prevent other wireless stations from using the second wireless channel and interfering with the wireless station.

13. The method as in claim 12, wherein an operator of the wireless station is a PAL (Priority Access License) user.

14. The method as in claim 12 further comprising:
    in response to detecting cease of use of the first wireless channel by the incumbent entity and reallocation of the first wireless channel to the wireless station, providing notification from the first allocation management resource to the second allocation management resource to prevent other wireless stations from using the first wireless channel and interfering with the wireless station.

15. The method as in claim 1 further comprising:
    generating a notification indicating the wireless station being assigned a second wireless channel based on use of the first wireless channel by an incumbent entity having higher priority rights than the wireless station;

communicating the notification from the first allocation management resource to a second allocation management resource; and
receiving acknowledgement from the second allocation management resource of the assignment of the second wireless channel to the wireless station.

16. The method as in claim 1 further comprising:
assigning the wireless station use of a second wireless channel as a substitute to the first wireless channel; and
communicating a notification of the assignment of the second wireless channel from the first allocation management resource to a second allocation management resource, the notification indicating to provide interference protection with respect to use of the second wireless channel by the wireless station.

17. The method as in claim 1 further comprising:
in accordance with the particular channel notification mode, communicating a first channel update notification from the first allocation management resource to a recipient as specified by the wireless station during the registering, the first channel update notification indicating allocation of a second wireless channel to the wireless station as a substitute to the first wireless channel.

18. The method as in claim 1, wherein the communications from the wireless station specify a corresponding entity selected to receive the channel update notifications.

19. The method as in claim 18 further comprising:
communicating the channel update notifications to the corresponding entity as specified by the communications.

20. The method as in claim 19, wherein the channel update notifications indicate revocation of the first wireless channel.

21. The method as in claim 18, wherein the corresponding entity is the wireless station.

22. The method as in claim 18, wherein the wireless station is a first wireless station; and
wherein the corresponding entity is a second wireless station different than the first wireless station.

23. The method as in claim 18, wherein the corresponding entity is a domain proxy.

24. A wireless system shared amongst a hierarchal tier of users, the wireless system comprising:
a first allocation management resource operative to:
receive communications from a wireless station;
based on the received communications, register the wireless station to receive channel update notifications in accordance with a particular channel notification mode in which the wireless station is notified of wireless channel reassignments; and
allocate a first wireless channel for use by the wireless station;
wherein, to register the wireless station to receive the channel update notifications in accordance with the particular channel notification mode, the first allocation management resource is further operative to:
receive a message from the wireless station indicating that the wireless station supports the particular channel notification mode; and
in response to receiving the message, communicate an acknowledgement message to the wireless station, the acknowledgement message notifying the wireless station to implement the particular channel notification mode to receive channel update communications from the first allocation management resource.

25. The system as in claim 24, wherein the first allocation management resource is further operative to:
in response to detecting use of the first wireless channel by an incumbent entity having higher priority rights to the first wireless channel than the wireless station, and in accordance with the particular channel notification mode, transmit a control command indicating assignment of a second wireless channel for use by the wireless station instead of the first wireless channel.

26. The system as in claim 25, wherein the control command is included in a heartbeat response message communicated from the first allocation management resource to the wireless station, the heartbeat response message associated with allocation of the first wireless channel to the wireless station.

27. The system as in claim 24, wherein the first allocation management resource is further operative to:
in response to detecting use of the first wireless channel by an incumbent entity assigned a higher priority level than the wireless station to use the first wireless channel, transmit a notification from the first allocation management resource to the wireless station, the notification notifying the wireless station to discontinue use of the first wireless channel and use a second wireless channel as a substitute to the first wireless channel.

28. The system as in claim 24, wherein the first allocation management resource is further operative to:
from the first allocation management resource, in response to detecting use of the first wireless channel by an incumbent entity having higher priority rights to the first wireless channel than the wireless station and reallocation of a second wireless channel to the wireless station, provide notification of the reallocation to a second allocation management resource of an identity of a PAL (Priority Access License) operator associated with the wireless station.

29. The system as in claim 24, wherein the first allocation management resource is further operative to:
in response to detecting use of the first wireless channel by an incumbent entity having higher priority rights to the first wireless channel than the wireless station and allocation of a second wireless channel to the wireless station, provide notification from the first allocation management resource to a second allocation management resource of an identity of the second wireless channel assigned to the wireless station.

30. The system as in claim 24, wherein the first allocation management resource is further operative to:
in response to detecting use of the first wireless channel by an incumbent entity having higher priority rights to the first wireless channel than the wireless station and reallocation of a second wireless channel to the wireless station, provide notification from the first allocation management resource to a second allocation management resource to prevent other wireless stations from using the second wireless channel and interfering with the wireless station.

31. The system as in claim 30, wherein an operator of the wireless station is a PAL (Priority Access License) user.

32. The system as in claim 24, wherein the first allocation management resource is further operative to:
generate a notification indicating the wireless station being assigned a second wireless channel based on use of the first wireless channel by an incumbent entity having higher priority rights than the wireless station;

communicate the notification from the first allocation management resource to a second allocation management resource; and
receive acknowledgement from the second allocation management resource of the assignment of the second wireless channel to the wireless station.

33. The system as in claim 24, wherein the first allocation management resource is further operative to:
assign the wireless station use of a second wireless channel as a substitute to the first wireless channel; and
communicate a notification of the assignment of the second wireless channel from the first allocation management resource to a second allocation management resource, the notification indicating to provide interference protection with respect to use of the second wireless channel by the wireless station.

34. The system as in claim 24, wherein the first allocation management resource is further operative to:
in accordance with the particular channel notification mode, communicate a channel update notification from the first allocation management resource to a recipient as specified by the wireless station during the registering, the channel update notification indicating allocation of a second wireless channel to the wireless station as a substitute to the first wireless channel.

35. A method comprising:
at a first allocation management resource operated in a wireless network environment shared amongst a hierarchy of users:
receiving communications from a wireless station;
based on the received communications, registering the wireless station to receive channel update notifications in accordance with a particular channel notification mode in which the wireless station is notified of wireless channel reassignments;
allocating a first wireless channel for use by the wireless station; and
via the particular channel notification mode:
in response to detecting use of the first wireless channel by an incumbent entity having higher priority rights to the first wireless channel than the wireless station, transmitting a first control command from the first allocation management resource to the wireless station, the first control command notifying the wireless station to use a second wireless channel as a substitute to the first wireless channel; and
in response to detecting cessation of use of the first wireless channel by the incumbent entity, transmitting a second control command from the first allocation management resource to the wireless station, the second control command notifying the wireless station to use the first wireless channel as a substitute to the second wireless channel.

36. A method comprising:
at a first allocation management resource operated in a wireless network environment shared amongst a hierarchy of users:
receiving communications from a wireless station;
based on the received communications, registering the wireless station to receive channel update notifications in accordance with a particular channel notification mode in which the wireless station is notified of wireless channel reassignments;
allocating a first wireless channel for use by the wireless station; and
wherein the particular channel notification mode is an alternative to a default channel notification mode.

37. A method comprising:
at a first allocation management resource operated in a wireless network environment shared amongst a hierarchy of users:
receiving communications from a wireless station;
based on the received communications, registering the wireless station to receive channel update notifications in accordance with a particular channel notification mode in which the wireless station is notified of wireless channel reassignments;
allocating a first wireless channel for use by the wireless station; and
wherein the particular channel notification mode specifies a manner in which the wireless station is to be notified of the wireless channel reassignments.

38. A method comprising:
at a first allocation management resource operated in a wireless network environment shared amongst a hierarchy of users:
receiving communications from a wireless station;
based on the received communications, registering the wireless station to receive channel update notifications in accordance with a particular channel notification mode in which the wireless station is notified of wireless channel reassignments;
wherein registering the wireless station to receive channel update notifications in accordance with the particular channel notification mode includes: at the first allocation management resource, receiving a message from the wireless station indicating that the wireless station selects the particular channel notification mode, the particular channel notification mode being one of multiple types of notification modes supported by the wireless station to receive notification of the wireless channel reassignments; and
allocating a first wireless channel for use by the wireless station.

39. A method comprising:
at a first allocation management resource operated in a wireless network environment shared amongst a hierarchy of users:
receiving communications from a wireless station;
based on the received communications, registering the wireless station to receive channel update notifications in accordance with a particular channel notification mode in which the wireless station is notified of wireless channel reassignments;
allocating a first wireless channel for use by the wireless station;
wherein the particular channel notification mode is one of multiple channel notification modes supporting the channel update notifications; and
wherein the received communications specify selection of the particular channel notification mode.

* * * * *